March 10, 1936.  L. SAIVES  2,033,590
CLUTCH CONTROL FOR MOTOR VEHICLES
Filed July 18, 1932  2 Sheets-Sheet 1
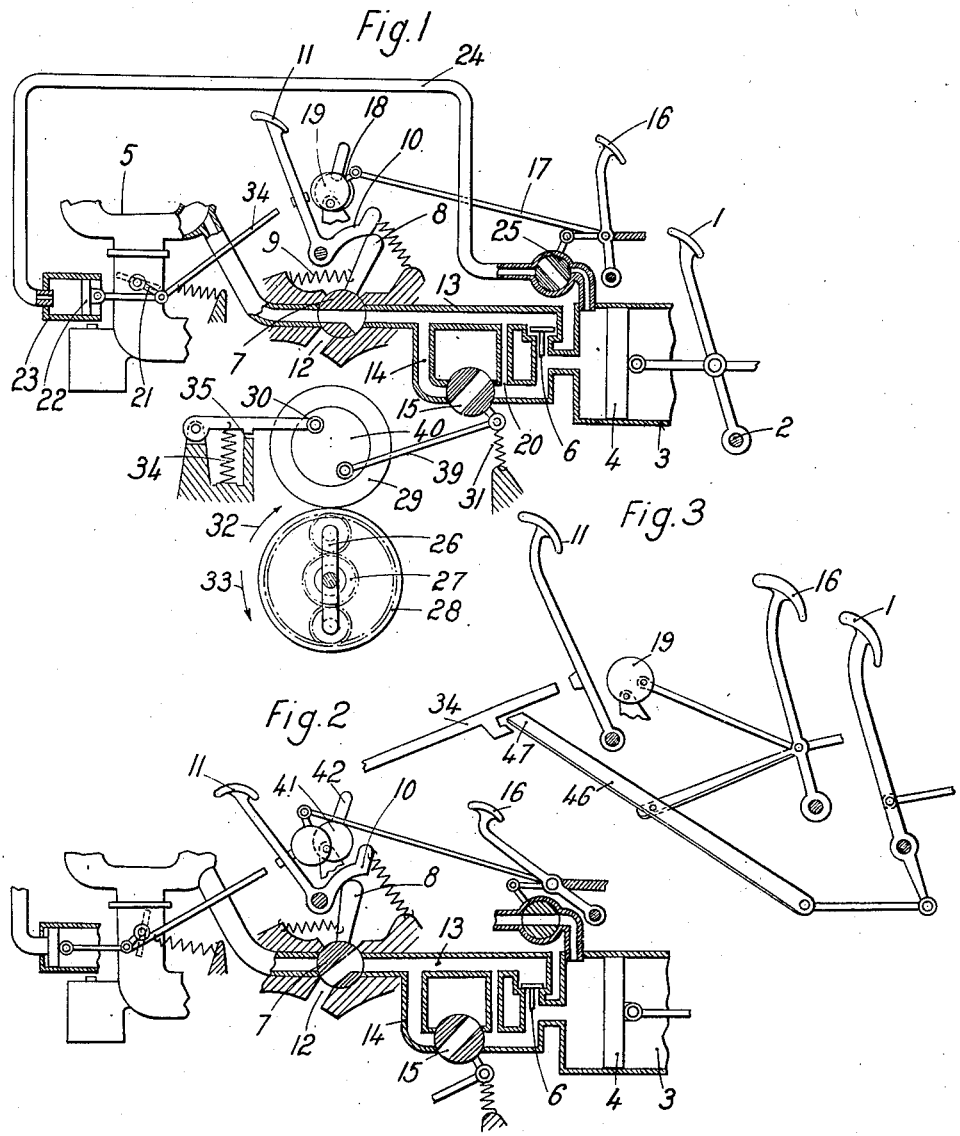
Leon Saives,
Inventor,
Attorney March 10, 1936.   L. SAIVES   2,033,590
CLUTCH CONTROL FOR MOTOR VEHICLES
Filed July 18, 1932    2 Sheets-Sheet 2
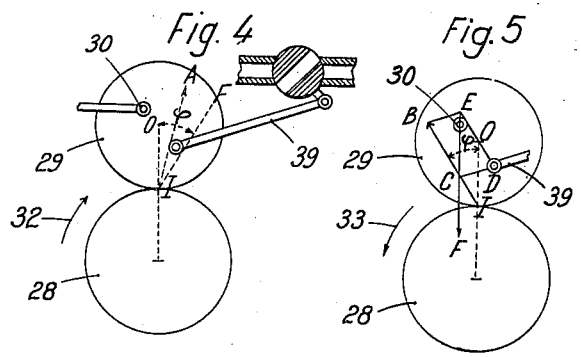
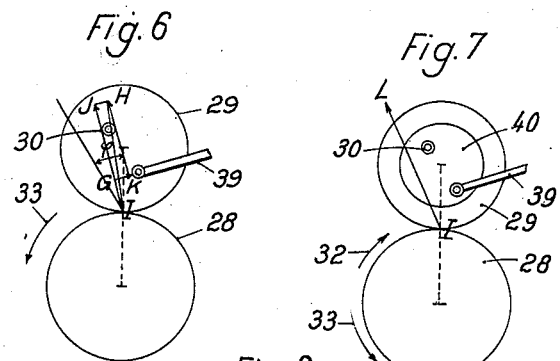
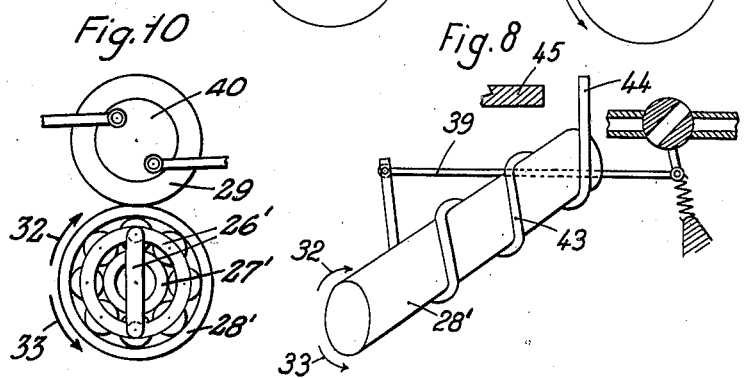
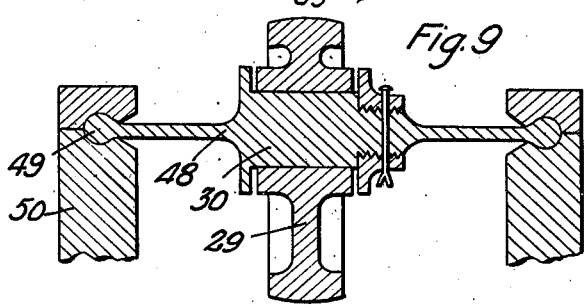
Leon Saives
Inventor
A. M. Bunn
Attorney Patented Mar. 10, 1936

2,033,590

UNITED STATES PATENT OFFICE 2,033,590

CLUTCH CONTROL FOR MOTOR VEHICLES

Leon Saives, Billancourt, France, assignor to Louis Renault, Billancourt, France Application July 18, 1932, Serial No. 623,237
In France August 27, 1931

10 Claims. (Cl. 192—.01)

An application of the same inventor filed on the 15th of January 1931 relating to "Improvements in or relating to the drive of self-propelled vehicles" has for its object to carry out declutching automatically when the accelerator pedal is released, and also covers an arrangement for controlling the speeds, which only allows the clutch to engage when the speeds of the shafts to be coupled are substantially the same; this application further provides a hand wheel enabling the automatic engagement of the clutch to be suppressed by bringing it under the sole influence of the ordinary declutching pedal.

If the automatic declutching control is used, it is not possible to effect braking with the assistance of the engine when the accelerator pedal is released. The present invention has for its object to provide additional arrangements which allow the disengagement of the clutch to be suppressed automatically when the brake pedal is operated. For this purpose it is only necessary to arrange for the hand wheel, provided for changing from automatic clutch control to ordinary control, to be actuated by the brake pedal.

In the above-mentioned application, however, an arrangement referred to as a "synchronizer" is provided which opposes the engagement of the clutch when the speeds of the shafts to be coupled are not substantially the same; consequently, if the accelerator pedal is released and the brake pedal is immediately actuated, the release of the accelerator pedal causes declutching to take place, whereas the operation of the brake pedal immediately causes the clutch to engage which may take place at once because the shafts have retained approximately the same speeds; if, on the other hand, the accelerator pedal has been released for some time, that is to say, if the wheels are allowed to run free, and the brake pedal is operated, the latter acts as before on the valve controlling the clutch engagement, but the clutch will not engage as it is opposed by the synchronizer, and in order that the brake may be operated it is necessary to suppress the action of the synchronizer or to accelerate the engine beforehand.

The suppression of the synchronizer action may be effected by obtaining a very gradual engagement of the clutch; for this purpose it is only necessary for the valve controlling the clutch engagement to allow air to enter the vacuum cylinder controlling the clutch, this admission of air being effected through a very small aperture.

The previous acceleration of the engine enables a more rapid engagement of the clutch to be adopted, which functions when the members to be engaged are running at substantially the same speeds and consequently, the synchronizer does not prevent the clutch engaging; in order to make this acceleration of the engine automatic when the brake pedal is operated, it is only necessary to connect the latter to a valve cock which controls a servo-motor acting on the gas valve, or to place this valve under the influence of a mechanical transmission which causes it to open when the brake and declutching pedals are both in the lowered position. Furthermore, in accordance with the invention, the two systems, namely, the suppression of the synchronizer action and the automatic acceleration of the engine at the time of braking, may be employed separately or simultaneously.

In order that the invention may be clearly understood a method of carrying it into effect is shown by way of example in the accompanying drawings, in which the two systems are combined. The accompanying drawings also show two ways of constructing the synchronizer, which may also be constructed in many other ways.

Fig. 1 is a diagrammatic view showing the complete arrangement.

Fig. 2 is a similar partial view showing the position of the various members when the brake pedal is operated.

Fig. 3 shows a method of constructing the mechanical transmission for opening the gas valve when the brake and declutching pedals are both lowered.

Figs. 4, 5, 6 and 7 are intended to explain the operation of the synchronizer shown in Fig. 1, and Fig. 8 shows another example for the construction of the synchronizer.

Fig. 9 is a section of the eccentric roller mounting, and

Fig. 10 is an end elevation showing the eccentric roller and synchronizer differential.

The declutching pedal 1, which can pivot around the shaft 2, is controlled automatically by the piston 4, which is displaced in the vacuum cylinder 3; this cylinder communicates with the admission piping 5 for the engine through a valve 6 and a distributing cock 7 integral with a finger 8 which is constantly drawn back by a spring 9 against the arm 10 of the accelerator pedal 11. When the accelerator pedal 11 is released, the distributor 7 causes the admission piping 5 to communicate with the cylinder 3 through the valve 6, which is held open by the engine vacuum; this communication ensures declutching. On applying pressure to the accelerator pedal, the distributor 7 causes the pipe 13 to communicate with the atmosphere through the aperture 12, the valve 6 being inserted in this pipe and closing under the action of atmospheric pressure, but this pipe 13 communicates with the cylinder 3 through a shunt pipe 14 controlled by a cock 15 actuated by the synchronizer, as will be explained later on.

It will be seen, therefore, that the above described arrangement ensures automatic declutching each time the accelerator pedal is released and ensures automatic engagement of the clutch when the accelerator pedal is actuated, on the condition, however, that the synchronizer permits this engagement by causing the cock 15 to open.

In accordance with the invention the automatic engagement of the clutch which is brought about by the operation of the accelerator pedal 11, is also effected by actuating the brake pedal 16 by means of a rod 17 controlling the hand wheel 18 which acts through an eccentric 19 on the accelerator pedal, and consequently actuates the distributor 7 as indicated above. The positions of the various members when pressure is applied to the brake pedal are indicated in Fig. 2.

It has been seen above that in order that the engagement of the clutch shall take place with reliability each time the brake pedal is operated, it is necessary either to suppress the action of the synchronizer or to accelerate the engine beforehand, or to employ these two methods simultaneously. To enable the action of the synchronizer to be suppressed the pipe 13 communicates with the cylinder 3 by means of a tube 20 of very small size; in this way when the brake pedal or the accelerator pedal is actuated, thus causing the operation of the distributor 7 which places the pipe 13 in communication with the atmosphere, the atmospheric air can enter the cylinder 3 slowly through the tube 20, thereby causing a very gradual engagement of the clutch, which is necessary if the speeds of the members to be coupled differ appreciably.

In order to allow the previous acceleration of the engine when the brake pedal is operated, the valve 21 for the gas valve is controlled by a servo-motor consisting of a piston 22 which is displaced in a cylinder 23 communicating with the cylinder 3 by a pipe 24 in which a cock 25, operated by the brake pedal 16, is inserted; in this way, when the engine is declutched and the brake pedal is actuated, the opening of the cock 25 places the cylinder 23 in communication with the cylinder 4 in which a vacuum exists, so that the piston 22 moves in the cylinder 23 and opens the gas valve; this acceleration tends to equalize the speeds of the members to be coupled, and after a very short time the synchronizer functions to open the cock 15 and allow the clutch to engage; the gas valve then returns at once to its closed position.

In the example shown in Fig. 1 the two systems are employed simultaneously since the tube 20 allows the gradual engagement of the clutch independently of the synchronizer whilst the pipe 24 permits the previous acceleration of the engine when the brake pedal is actuated.

Instead of a pneumatic transmission, a mechanical transmission may be employed for controlling the previous acceleration of the engine; Fig. 3 shows an example of a transmission of this kind. A double arm rocking lever 46 is provided with a head 47 which can act upon the rod 34 controlling the carburettor valve and is connected to the brake pedal 16 and to the clutch pedal 1 in such a way that when the pedal 1 is in the declutching position and the pedal 16 is raised, the head 47 makes contact if the carburetor valve is closed, so that if pressure is applied under these conditions to the pedal 16, the head 47 presses against the rod 34 thus causing the valve to open, and, the pedal 16 being always in the lowered position, on raising the pedal 1 to the position for engaging the clutch the head 47 is caused to recede, at the same time releasing the rod 34; in this way the same result is obtained as with the pneumatic transmission shown in Fig. 1.

The synchronizer shown in Fig. 1 consists of a differential, one of the three elements 26 of which is connected to the engine, whilst another, 27, is connected to the primary shaft of the gear box, the third element 28 running loose and being provided with a pulley, a drum or a shaft which is concentric with the main shaft; the ratio of the transmission to the engine and the primary shaft, and the numbers of the pinion teeth are such that the loose member becomes stationary when the engine and the primary shaft rotate at substantially the same speed. An eccentric roller 29, which can pivot around the shaft 30, bears upon the pulley, the shaft or the drum constituted by the loose element 28, either by its own weight or by means of a spring 31 acting on the connecting rod 39 which connects the roller to the cock 15. When the drum rotates in the direction of the arrow 32 it rubs against the roller which slides without moving, whilst when the drum rotates in the other direction, that is to say in the direction of the arrow 33, the roller is held and carried along and passes to a position which is symmetrical with relation to a plane passing through its axis 30 and the axis of the drum, this displacement causing the operation of the cock 15 through the connecting rod 39; the passage from one position to the other is made possible either by the resiliency of the shaft 30, or by its displacement in a slide or in a housing having a spring 34 and a stop 35, or owing to the resiliency of the roller of the drum. Said shaft can present resiliency in order to permit displacement of its central part 40, on which turns the eccentric roller 29; for this purpose the shaft may be constituted as shown in Fig. 9. The ends 48 of the shaft 30, are thin, whereas its central part, carrying the roller 29, is massive and rigid; the ends 48 are terminated by balls 49 maintained in fixed supports 50. The lengths of the ends 48 being equal, the roller 29 remains perpendicular through the forces applied to it; the central part moves but remains parallel to its direction at rest.

The principle of operation of this synchronizer may be easily understood on referring to Figs. 4, 5, 6. If the drum rotates in the direction of the arrow 32 (Fig. 4) the reaction IA of the drum 28 on the roller 29 falls within the angle of friction OIF=φ. The roller can therefore only rise imperceptibly and slide, since it is held in position by the spring 31. If, on the other hand, the drum 28 rotates in the direction of the arrow 33 (see Fig. 5) and a force is exerted upon the rod 39 such that the roller remains in contact whilst sliding, the reaction of the drum is inclined to the centre line IO for the angle of friction φ and is directed along the line IB; this reaction, which has the value CB, is combined with the force CD exerted upon the rod 39 and gives a resultant CE which opposes the reaction CF of the shaft 30. If the tension GK now exerted upon the rod 39 is less than CD (see Fig. 6) the position of the shafts and the value of the angle of friction remaining the same, the reactions GH and GJ of the shaft 30 and the drum 28 are such that the force GJ will fall within the angle of friction and the roller will no longer slide, but will be carried along.

To prevent wear on the roller due to slip and the restriction of the contact to one point, this roller 29 may be mounted with a gentle friction on a hub 40, (see Fig. 7), this hub 40 being itself eccentric to its axis of oscillation 30. When the drum 28 rotates in the direction of the arrow 32, the roller 29 is carried along, but the eccentric hub 40 does not move, whereas when the drum rotates in the direction of the arrow 33 the hub is carried along by a block together with the roller since the positions and dimensions of the shafts are selected in accordance with the coefficients of friction of the roller upon the drum and upon the hub in such a way that the reaction IL indicated in the figure corresponds to the case in which movement takes place.

Instead of gears, the synchronizer may be constructed with rollers operating by adhesion; it may also consist of a set of ball bearings, the inner rim, the outer rim and the cage for the balls of which respectively constitute the three members 27′, 28′ and 26′ of the differential, as illustrated in Figures 9 and 10.

The eccentric 19 for lever 18, which controls the distributor 7, may be divided into two parts as indicated in Figs. 1 and 2, the second eccentric 41 then being controlled by the lever 42 independently of the operation of the brake pedal.

The roller 29 may be replaced by any other devices responding to the direction of rotation of the loose member 28. In particular, the arrangement shown in Fig. 8 may be used, which consists of a spring 43 wound round the loose member 28′ comprising a shaft in the example illustrated. If the loose member rotates in the direction of the arrow 32, it will have no effect, whereas on the other hand, when it rotates in the direction of the arrow 33 it effects the locking of the spring 43 which is lightly pressed against the shaft, and this spring moves the control 39. At the end or its course one of the ends 44 of the spring 43 comes against a stop 45 and the spring is relaxed.

It is understood that the constructional examples described in connection with the synchronizer and the control of the various valves are not of a limiting nature and are shown solely to enable the principle of the invention to be more clearly understood.

I claim:

1. An automatic control device for declutching and engaging the clutch of a self-propelled vehicle, comprising a clutch pedal, a piston connected to said clutch pedal, a cylinder in which moves said piston, a pipe connecting said cylinder with a source of sub-atmospheric pressure, a distributing cock in said pipe, an accelerator pedal, means for rotating said cock by a down movement of said accelerator pedal so as to close the pipe and put it in communication with the atmosphere, a brake pedal and means for rotating said cock in the same way by a down movement of said brake pedal, and means for preventing a rapid engagement of the clutch when the speeds of its two parts are substantially different, and means for controlling the opening of the throttle by the downward movement of the brake pedal before the control of the engagement of the clutch by the same movement.

2. An automatic control device for declutching and engaging the clutch of a self-propelled vehicle, comprising a clutch pedal, a piston connected to said clutch pedal, a cylinder in which moves said piston, a pipe connecting said cylinder with a source of sub-atmospheric pressure, a distributing cock in said pipe, an accelerator pedal, means for rotating said distributing cock by a down movement of said accelerator pedal so as to close the pipe and put it in communication with the atmosphere, a brake pedal, means for rotating said distributing cock by movement of said brake pedal, a valve in said pipe opening under the pressure in said cylinder, a shunt around said valve, a cock in said shunt pipe, and means for closing said latter cock when the speeds of the two parts of the clutch are substantially different.

3. An automatic control device for declutching and engaging the clutch of a self-propelled vehicle, comprising a clutch pedal, a piston connected to said clutch pedal, a cylinder in which moves said piston, a pipe connecting said cylinder with a source of sub-atmospheric pressure, a distributing cock in said pipe, an accelerator pedal, means for rotating said cock by a down movement of said accelerator pedal so as to close the pipe and put it in communication with the atmosphere, a brake pedal, means for rotating said cock in the same way by a down movement of said brake pedal, a piston connected to the throttle valve of the engine of the self-propelled vehicle, a cylinder in which moves said piston connected to the throttle valve, a pipe connecting said cylinders, a cock on said latter pipe and means for opening said latter cock by a down movement of said brake pedal.

4. An automatic control device for declutching and engaging the clutch of a self-propelled vehicle, comprising a clutch pedal, a piston connected to said clutch pedal, a cylinder in which moves said piston, a pipe connecting said cylinder with a source of sub-atmospheric pressure, a distributing cock in said pipe, an accelerator pedal means for rotating said cock by a down movement of said accelerator pedal so as to close the pipe and put it in communication with the atmosphere, a brake pedal, means for rotating said cock in the same way by a down movement of said brake pedal, a throttle valve for the admission of the engine of the self-propelled vehicle, a rod connected to said throttle valve, and operated by said accelerator pedal, and a double-arm rocking lever connected at an end to said clutch pedal and at its middle part to said brake pedal whereas its other end operates said rod.

5. An automatic control device for declutching and engaging the clutch of a self-propelled vehicle as claimed in claim 2, in which the means for closing said latter cock when the speeds of the two parts of the clutch are substantially different comprise a differential with a sun gear connected to the clutch parts, an eccentric roller in contact with one of the gears of said differential said third gear and a rod connecting said roller to said latter cock.

6. In an automatic clutch device for declutching and engaging the clutch of a self-propelled vehicle, comprising an accelerator pedal, a brake pedal, means for controlling the engagement of the clutch by the movement of said accelerator pedal, means for controlling the engagement of the clutch by movement of the brake pedal, and means operated by the relative rotative movement of the clutch elements controlling the engagement of the same.

7. The substance of claim 6, characterized in that means are provided for gradually permitting engagement of the clutch.

8. An automatic control device for declutching and engaging the clutch of a self-propelled vehicle, comprising an accelerator pedal, a brake pedal, means for controlling the engagement of the clutch by the down movement of said accelerator pedal, means for controlling the engagement of the clutch by the down movement of said brake pedal, and means for preventing a rapid engagement of the clutch when the speeds of its parts are substantially different.

9. An automatic control device for declutching and engaging the clutch of a self-propelled vehicle, comprising an accelerator pedal, a brake pedal, means for controlling the engagement of the clutch by the down movement of said accelerator pedal, means for controlling the engagement of the clutch of the down movement of said brake pedal, means for preventing a rapid engagement of the clutch when the speeds of its two parts are substantially different, and means for controlling the opening of the accelerator by the down movement of the brake pedal before the control of the clutch by the same movement.

10. An automatic control device for declutching and engaging the clutch of a self-propelled vehicle, comprising an accelerator pedal, a brake pedal, means for controlling the engagement of the clutch by the down movement of said accelerator pedal, means for controlling the engagement of the clutch by the down movement of said brake pedal, means for preventing a rapid engagement of the clutch when the speeds of its two parts are substantially different, and means for allowing a slow re-engagement of the clutch when the speeds of its two parts are substantially different and when the brake pedal is depressed.

LEON SAIVES.